J. H. LUTHER.

Grab-Tool for Oil-Wells.

No. 5,386.

Reissued April 29, 1873.

Witnesses
E. A. Standbury
H. P. Bell

Inventor:
James H. Luther
By his Attorney
Chas. F. Pansbury

THE NORRIS PETERS CO., PHOTO-LITHO., WASHINGTON, D. C.

UNITED STATES PATENT OFFICE.

JAMES H. LUTHER, OF PETROLEUM CENTRE, PENNSYLVANIA.

IMPROVEMENT IN GRAB-TOOLS FOR OIL-WELLS.

Specification forming part of Letters Patent No. 56,961, dated August 7, 1866; reissue No. 5,386, dated, April 29, 1873; application filed January 14, 1873.

*To all whom it may concern:*

Be it known that I, J. H. LUTHER, of Petroleum Centre, Venango county and State of Pennsylvania, have invented a new and Improved Grab; and do hereby declare the following to be a full and correct description of the same, reference being had to the accompanying drawing, in which—

Figure 1:
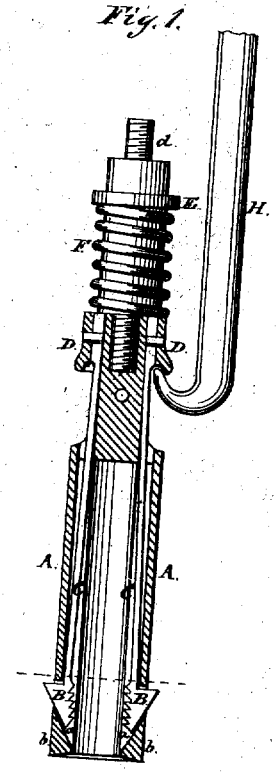
Figure 2:
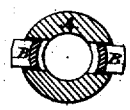

Figure 1 is a central vertical section of the same. Fig. 2 is a transverse section taken in the plane of the line *x x*.

Similar letters of reference indicate like parts.

In the drilling of oil, Artesian, and other deep wells, the drilling-tool often becomes fast in the well or bore, thus rendering it necessary to abandon the well, even when nearly completed. To produce an implement by which the tool, when it has become fast in the well or bore, can be withdrawn from the same is the object of the present invention, and by it a tool, or "grab," as I term it, is produced with which the desired object can be effected, its peculiar construction also enabling it to be detached from the drill-tool in the well, if found so fixed as to render it impossible to withdraw it without further loosening, by a spear, or in any other suitable manner, thus avoiding the still further clogging of the well or bore by the addition of broken particles of the grab.

A in the drawing represents a hollow wrought-iron cylinder or tube, with seats *a* formed upon its inside, and extending in the direction of its length, which seats, at the lower end of the tube, are milled entirely through its thickness, with bevel or inclined faces *b*. B are the grabs, fitted to the faces *b* of the tube A, which grabs, by thin metallic strips or bands *c*, are connected to a common loose collar or ring, D, upon the outside or stems of the tube A, near its upper end, and resting upon projecting pins *c* of the same. Between this collar D and the shoulder E of the tube A a spiral spring, F, is coiled or wound, by means of which spring the collar is held to its seat upon the pins *c*, and brought down upon the same, when by any suitable means it is raised or moved upward upon the tube. The inner faces of the grabs B are serrated or toothed to prevent them from slipping when set upon the tool which they are to remove. The stem of the tube, above its shoulder E, is provided with a screw-thread, *d*, for screwing or fastening the grab to a rod or other suitable device to enable it to be lowered into the well or bore or tube from which a tool that is fast is to be removed.

In the use of the grab constructed as above explained and shown in the drawing, it is first screwed to one end of a rod of suitable length, whether made in sections or of one continuous piece or length, and by such rod lowered into the well, (the distance between the grab-jaws then being less than the size of the piece or tool which is fast in the well,) when, as soon as the tube A has reached the said piece or tool that is to be extracted, it is driven down over the same in any proper manner, thus forcing the grab-jaws up and outward through their seat-openings *a a* of the said tube until the said tube has been driven down as far as is considered necessary; it is then drawn up, its grab-jaws tightly pinching and holding the said tool, when, if satisfied such tool cannot thus be stirred, the grab is then to be detached and withdrawn from the well, and the said tool then speared, as it is termed, and by that means loosened in its seat in the well or bore, when the grab is again applied to it, as before; and so on until finally removed, the grab being detached from the tool in the well or bore by means of a hook, shown at H in the drawing; that, being lowered into the same and hooked on the under side or edge of the loose collar, enables such collar to be raised sufficiently to withdraw or free the grab-jaws from the drill-tool, as is obvious without any further explanation.

Having thus fully described my invention, what I claim, and desire to secure by Letters Patent, is—

1. In a tool for extracting articles from oil-wells, the wedge-shaped grab, in combination with and operated by an inclined seat, in the manner described.

2. The combination of the grabs B, the strips *c c*, and ring D, constructed and operating as described.

3. The combination of the wedge-shaped grabs B, having inclined and rounded backs, as shown, with the inclined and rounded seats *a a*, milled or turned in or through the sides of the cylinder *b*, as specified and shown.

The above specification of my said invention signed and witnessed at Petroleum Centre this 31st day of December, A. D. 1872.

JAMES H. LUTHER.

Witnesses:
SAM. RAYNOLDS,
EDWARD TARR.